No. 874,135.

PATENTED DEC. 17, 1907.

E. T. SULZER, M. GARANGER & V. J. DEY.
AMUSEMENT APPARATUS.
APPLICATION FILED JUNE 6, 1906.

2 SHEETS—SHEET 1.

WITNESSES:
Fred White
René Bruine

INVENTORS:
Ernest T. Sulzer,
Maurice Garanger
and Valentine J. Dey,
By Attorneys, No. 874,135. PATENTED DEC. 17, 1907.
E. T. SULZER, M. GARANGER & V. J. DEY.
AMUSEMENT APPARATUS.
APPLICATION FILED JUNE 6, 1906.

2 SHEETS—SHEET 2.

WITNESSES:
Fred White
René Bruine

INVENTORS:
Ernest J. Sulzer, Maurice Garanger
and Valentine J. Dey,
By Attorneys,

UNITED STATES PATENT OFFICE.

ERNEST T. SULZER, MAURICE GARANGER, AND VALENTINE J. DEY, OF NEW YORK, N. Y.

AMUSEMENT APPARATUS.

No. 874,135.  Specification of Letters Patent.  Patented Dec. 17, 1907.

Application filed June 6, 1906. Serial No. 320,388.

*To all whom it may concern:*

Be it known that we, ERNEST T. SULZER, a citizen of the United States, MAURICE GARANGER, a citizen of France, and VALENTINE J. DEY, a citizen of the United States, all residing in the borough of Manhattan, city, county, and State of New York, have jointly invented certain new and useful Improvements in Amusement Apparatus, of which the following is a specification.

This invention aims to provide an interesting and exciting amusement apparatus in which passengers are carried on wooden horses, carriages, vehicles, or other carrying devices such as are common in ordinary carousels. According to this invention, however, different carrying devices are driven around the course at different speeds, and means are preferably provided for controlling the relative speeds at will so as to add to the pleasure of the ride the excitement of a race.

The accompanying drawings illustrate embodiments of the invention.

Figure 2:
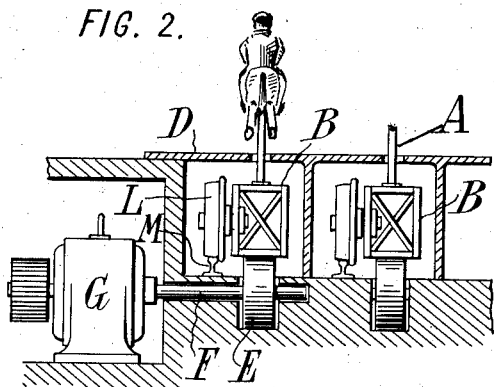
Figure 1:
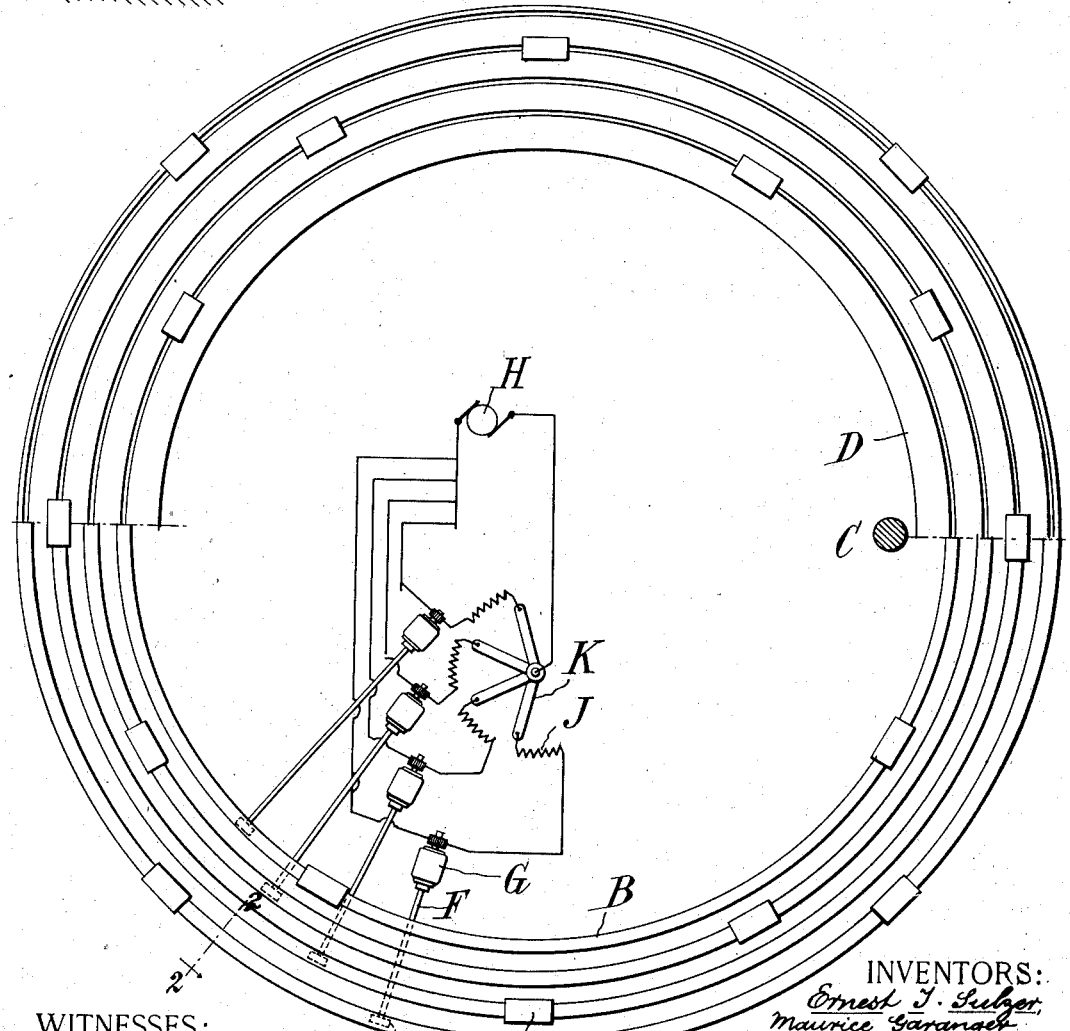
Figure 3:
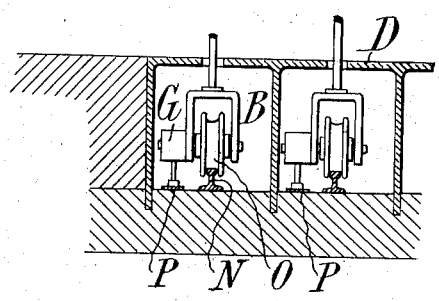
Figure 4:
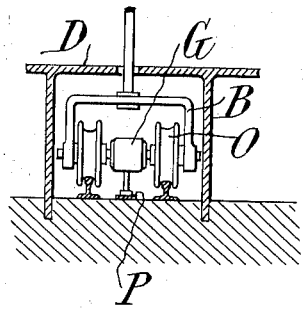
Figure 5:
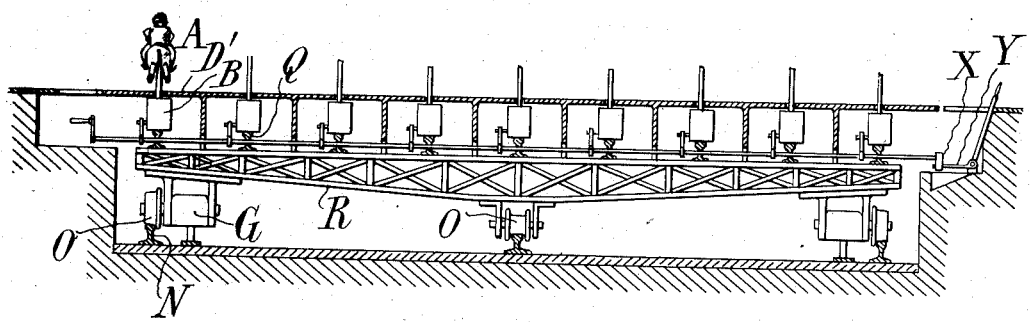
Figure 6:
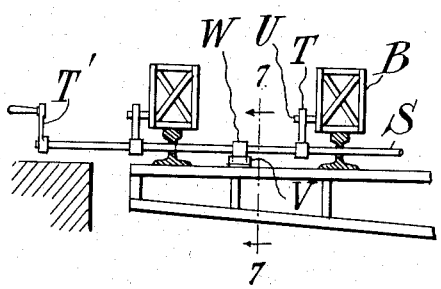
Figure 7:
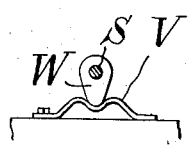

Figure 1 is a plan showing the driving and controlling mechanism more or less diagrammatically. Fig. 2 is a transverse section approximately on the line 2—2 of Fig. 1. Figs. 3 and 4 are similar transverse sections of other constructions. Fig. 5 is a transverse view of still another construction, of which Figs. 6 and 7 are details.

Referring to the embodiment of the invention illustrated, the carrying devices A are mounted on rings B arranged concentrically and alongside of each other, any desired number of carrying devices being mounted on each ring. The rings are then rotated at different speeds by any one of various suitable mechanisms, and preferably also an operator who may be himself unseen is enabled to control the relative speeds or the absolute speed of the individual rings so as to make first one and then another set of riders go faster. A post C or other mark may be erected to indicate the finish line of the race, the rider nearest to the post at the rear thereof being the winner. A platform D provides access to the carrying devices and conceals substantially all the other moving parts.

Each ring B is preferably a stiff framed structure, as indicated in the detail figures. Or it may be articulated or flexible, in which case the circular shape may be held by suitable guiding means. The diameters of the rings may be small or may be very great, and there is no limit to the number of rings which may be used. The rings are not necessarily circular.

For driving the rings I may use the mechanism illustrated in Figs. 1 and 2 in which each ring rests upon a number of supporting rollers E one of which has a shaft F driven by an electric motor G, so that the roller becomes a driving roller as well as a support. For controlling the relative speeds of the different rings the several motors G may be connected to a generator or other source of power H through the intermediation of rheostats J the arms K of which are independently movable so that they may introduce a greater or less resistance into any one of the circuits and thus vary the speed of any one of the rings. With the rollers E of the plain cylindrical shape shown, guide wheels L will also be provided at intervals, running upon a guide rail M.

According to the construction shown in Fig. 3, each ring B runs upon a supporting rail N, which serves also as a guiding rail, the rollers O of the ring being double-flanged. In this case each ring carries its own motor G similar to ordinary street-car motors, and which derives its current by means of a sliding or rolling contact with a conductor P. The speed in this case may be controlled by introducing different resistances into the circuits of the several conductors P.

As shown in Fig. 4, there may be a pair of wheels O for each ring, a motor G being arranged between and making contact with a conductor P.

According to each of the previously described constructions not only is the speed different for the different rings, but the speeds of the different rings are at all times under control.

Figs. 5, 6 and 7 illustrate a construction in which the angular speeds are the same for a time, but in which the speeds are varying at the finish and are not controllable. The rings B in this case rest with a certain amount of friction on supporting rails Q arranged upon a series of frames R constituting a common base for all the rings. The base in turn is provided with supporting and guiding rollers O resting upon stationary rails N. One or more motors G drive the entire base with the rails Q. The several carriages A are guided by means of slots in the floor D', which in this case rotates with the base. A shaft S is provided with a number of cranks T adapted when turned upward to engage pins U carried by the several rings B; and with an operating crank T' on the end for turning up the cranks T. An impositive lock, such, for example, as the notched spring V, may be provided at any suitable point adapted to be engaged by a crank or cam W on the shaft to hold the latter from turning. A crank X may also be provided on the opposite end of the shaft adapted to be engaged by an arm Y when the latter is thrown up, so that the shaft will be turned into a position to release the pins U and the carriages, and the latter will run of their own momentum at varying speeds.

Though we have described with great particularity of detail certain specific embodiments of our invention, yet it is not to be understood therefrom that the invention is limited to the specific embodiments disclosed, various modifications therein in detail and in the arrangement and combination of the parts may be made by those skilled in the art without departure from the invention.

What we claim is:—

An amusement apparatus including in combination a plurality of carrying devices arranged alongside of each other, supporting rails Q, a common base carrying the supporting rails for all said devices, means for driving said common base, and means for connecting said carrying devices to said base so as to be driven therewith and for releasing them from said base so as to permit them to travel by their momentum independently of each other.

In witness whereof, we have hereunto signed our names in the presence of two subscribing witnesses.

ERNEST T. SULZER.
MAURICE GARANGER.
VALENTINE J. DEY.

Witnesses:
  DOMINGO A. USINA,
  THEODORE T. SNELL.